(12) United States Patent
Hu

(10) Patent No.: US 11,791,900 B1
(45) Date of Patent: Oct. 17, 2023

(54) TERAHERTZ TRANSCEIVER USING LASER SOURCES

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

(21) Appl. No.: 18/204,919

(22) Filed: Jun. 1, 2023

(51) Int. Cl.
  *H04B 10/40* (2013.01)
  *H04B 1/3827* (2015.01)
  *G02F 2/00* (2006.01)

(52) U.S. Cl.
  CPC ............ *H04B 10/40* (2013.01); *G02F 2/002* (2013.01); *H04B 1/385* (2013.01); *G02F 2202/12* (2013.01); *G02F 2203/13* (2013.01)

(58) Field of Classification Search
  CPC ......... H04B 10/40; H04B 1/385; G02F 2/002; G02F 2202/12; G02F 2202/13
  USPC ....................................................... 398/118
  See application file for complete search history.

(56) References Cited

U.S. PATENT DOCUMENTS

| | | | | |
|---|---|---|---|---|
| 8,890,773 | B1 * | 11/2014 | Pederson | H04B 1/385 |
| | | | | 345/8 |
| 2007/0229937 | A1 * | 10/2007 | Josef Moeller | G02F 2/002 |
| | | | | 359/326 |
| 2012/0068090 | A1 * | 3/2012 | Park | H01S 5/1092 |
| | | | | 250/493.1 |
| 2012/0147907 | A1 * | 6/2012 | Kim | G02F 1/3534 |
| | | | | 372/4 |

* cited by examiner

*Primary Examiner* — Dalzid E Singh
(74) *Attorney, Agent, or Firm* — Joe Zheng

(57) ABSTRACT

A transceiver based on at least one optical source is provided to facilitate wireless communication in a wearable display device, where the wearable display device is embedded with one or more planar antennas. The transceiver operates in terahertz and may be coupled to two different antennas, one for transmission and the other for reception.

14 Claims, 16 Drawing Sheets

470

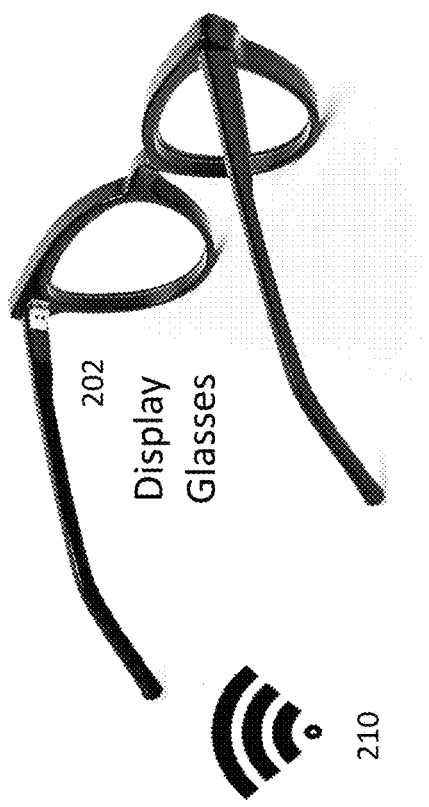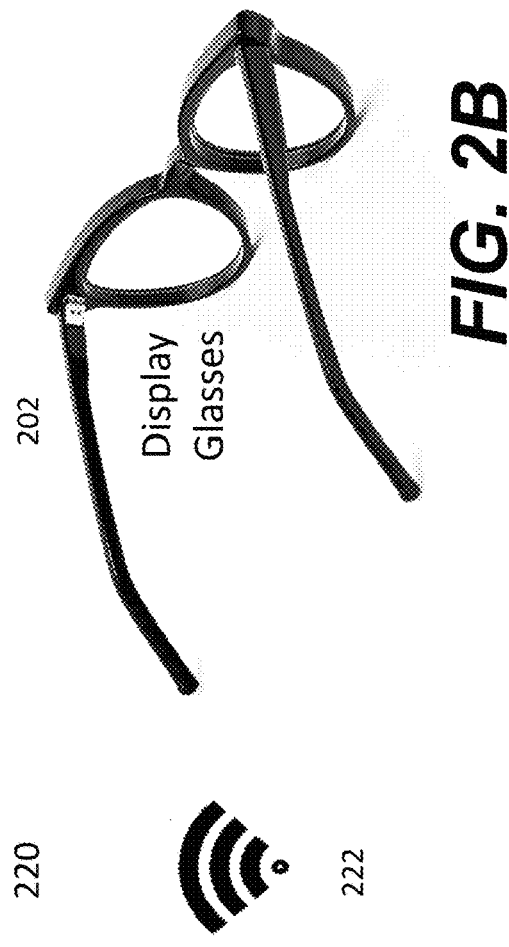

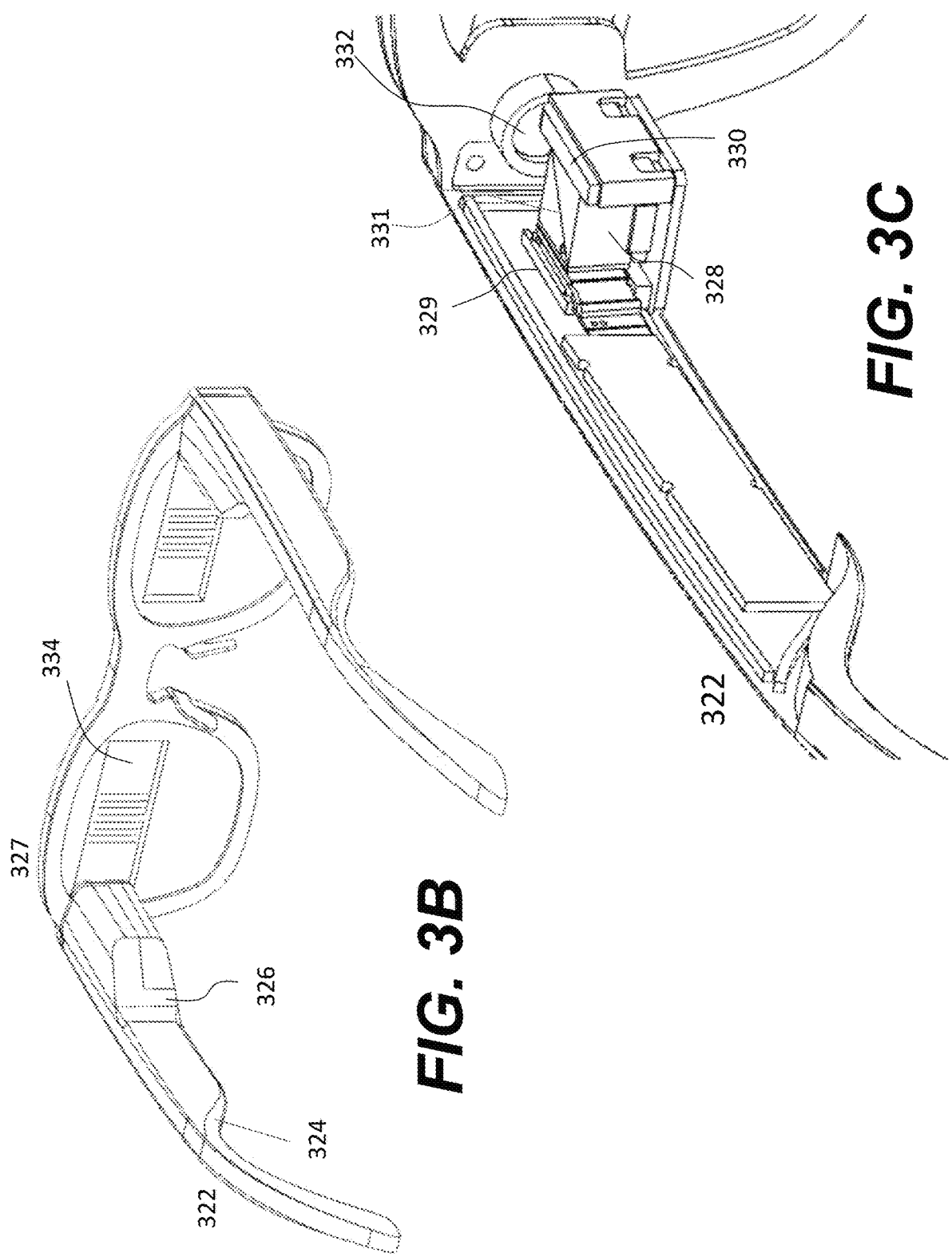

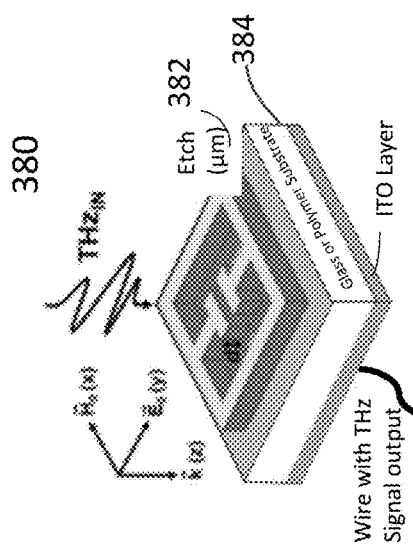
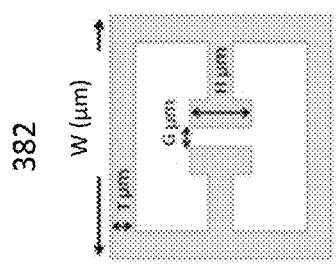
*FIG. 3F*
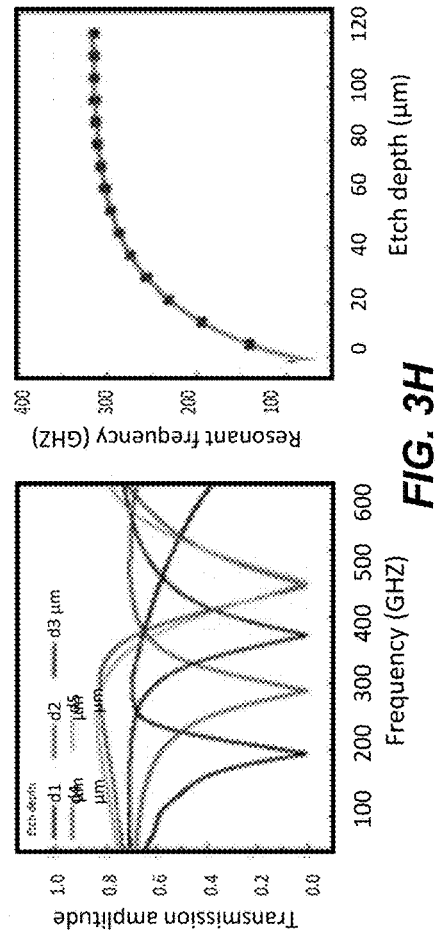
*FIG. 3H*
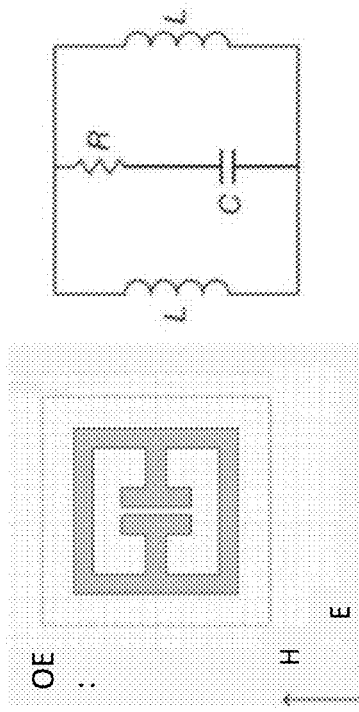
*FIG. 3G*

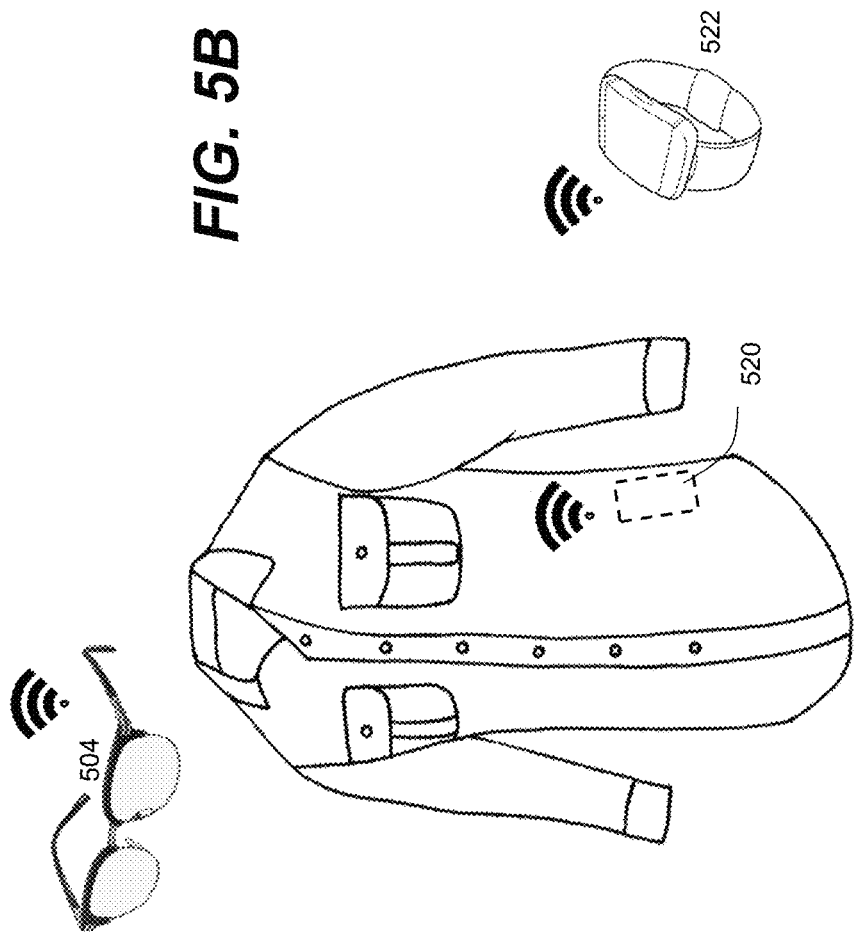

TERAHERTZ TRANSCEIVER USING LASER SOURCES

BACKGROUND OF THE INVENTION

Field of the Invention

The present invention generally relates to the area of display devices and particularly relates to architecture and designs of display devices with wireless interfaces and wireless transceiver. More particularly, the present invention employs a very-high frequency band (e.g., terahertz or THz) for a wearable display device to communicate with a source, where an appropriate transceiver is provided to facilitate wireless communication between the display device and the source.

Description of the Related Art

AR (Augmented Reality), VR (Virtual Reality), XR (Extended Reality) and other similar terms are all related to immersive technologies that enhance or augment the way people perceive and interact with the world, where XR is generally an umbrella term that encompasses both AR and VR or mixed reality (MR), as well as other immersive technologies that blend the real and virtual worlds. XR enables users to interact with virtual objects in a physical space. XR is an emerging field with many potential applications in entertainment, education, healthcare, and more.

XR (Extended Reality) is typically delivered through a combination of hardware and software components. The hardware and software work together to create a seamless and immersive experience for a user. The exact delivery method may vary depending on the specific type of XR experience and the hardware and software being used.

One of the popular delivery methods is via a wearable display device. A wearable display device is a type of electronic device that can be worn on the body and used to display information, images, or video. It can be used for a variety of purposes, including gaming, entertainment, communication, fitness tracking, and more. Wearable display devices can vary in size, shape, and functionality depending on the intended use case. They typically include a screen or other type of display technology, as well as sensors, processors, and other components needed to provide the desired functionality. To make such a device more wearable, the components on the device are often kept minimum to make the weight as light as possible.

FIG. 1A shows an exemplary goggle commonly seen in the market for the application of delivering or displaying VR or AR. No matter how a goggle is designed, it appears bulky and heavy, and causes inconvenience when worn on a user. FIG. 1B shows a sketch of HoloLens from Microsoft. With the weight being reduced over the years via various design improvement, it remains bulky. A wearer won't feel comfortable when wearing it for a period. Indeed.

FIG. 1C shows a type of glasses 100 that can also be used for the application of XR or other immersive experience. The glasses 100 appear no significant difference to a pair of normal glasses but include one or two flexible cables 102 and 104 that are respectively extended from the temples 106 and 108. Both of the flexible cables 102 and 104 are coupled at another end thereof to a portable computing device 110, where the computing device 110 or external box 110 includes necessary components to generate various data to drive a microdisplay in the box 110 or a display in the glasses 100. The cable or cables 102 and 104 include a plurality of wires carrying power, control signals and various data between the box 110 and the glasses 100. The cables 102 and 104, however, inhibit complete free movements of a wearer of the glasses 100. Thus there is a need for solutions of providing a mechanism so that a wearer of a wearable display device is not restrained from any movement.

One of the possible mechanisms is to make the communication between a wearable display device and a computing device wireless. Traditional wireless communication (e.g., Wi-Fi or Radio) between these two devices, however, would likely add more components to the wearable display device. Should other types of wireless protocol be used, an appropriate transceiver must be provided. Thus there is still another need for solutions that would make the wireless communication feasible without adding additional weights on the wearable display glasses.

There are many other needs that are not to be listed individually but can be readily appreciated by those skilled in the art that these needs are clearly met by one or more embodiments of the present invention detailed herein.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to designs of wearable display devices that may be for applications of XR or other immersive experience. According to one aspect of the present invention, a wearable display device is made in form of a pair of glasses and includes an antenna layer and a transceiver. The antenna layer includes an antenna array or a plurality of antenna elements. The antenna layer may be disposed on top of one or both of integrated lenses in the glasses. Each of the lenses has a designated display area based on a light waveguide.

According to another aspect of the present invention, the antenna elements are formed in strips in accordance with certain geometry shapes formed to maximize its transceiving efficiency. The thickness, length, width and even turns of the conductive strips as well as the gap between two conductive strips are very well specified to ensure the impedance matching along with the maximized transceiving efficiency including the sensitivity of the antenna and other parameters. Nevertheless, the strips are small in sizes and often formed via a semiconductor etching process, therefor these antenna elements can be unnoticeable when disposed on top of a lens.

According to still another aspect of the present invention, the antenna elements may also be disposed over any port of the glasses frame including the temples.

According to still another aspect of the present invention, the wearable display device includes a separate balancing unit or balancer to house circuitry, batteries or etc., where the balancing unit is coupled to the glasses frame via a pair of cables. The balancer is provided to counteract the weight of the device so that the wearer may feel balanced in weight when wearing the glasses.

According to still another aspect of the present invention, a transceiver based on at least one optical source is provided to facilitate the wireless communication in the wearable display device. The transceiver operates in terahertz and may be coupled to two different antennas, one for transmission and the other for reception.

The present invention may be implemented as an apparatus, a method, a part of system. Different implementations may yield different benefits, objects and advantages. In one embodiment, the present invention is a wearable display device comprising: an eyeglasses frame, at least one integrated lens including a light waveguide, a temple attached to the eyeglasses frame, an enclosure integrated on one side of the temple, the enclosure including an image engine generating optical images to project into one side of the integrated lens; and an antenna layer, the antenna layer is disposed on top of or distributed over the integrated lens or part of the eyeglasses frame and the temple, where data is received wirelessly in the enclosure via the antenna layer to produce the optical images In another embodiment, the present invention is a wearable display device comprising: an eyeglasses frame, two integrated lenses respectively framed in the eyeglasses frame, each of the integrated lenses including a light waveguide and a designated viewing area based on the light waveguide, two temples respectively attached to the eyeglasses frame, each of the temples including an enclosure housing an image engine to generate optical images to project into one side of the light waveguide; and a balancing unit coupled respectively to the two temples to counteract a weight of the wearable display device when worn on a user thereof, wherein the balancing unit houses circuitry and batteries, two antenna layers, each disposed on top of or distributed over one of the integrated lenses or part of the eyeglasses frame and one of the temples, wherein data is received wirelessly in the enclosure via the balancing unit to produce the optical images.

In yet another embodiment, the present invention is a system for operating a terahertz transceiver, the system comprises: an antenna set; two optical sources generating two optical beams at two different frequencies, a photo mixer for generating or detecting terahertz (THz) radiation, wherein the two optical beams from the optical sources are directed onto a photoconductive material, a generated terahertz output signal is amplified and radiated as the terahertz radiation when applying a voltage bias across the photoconductive material. The system further comprises a local oscillator receiving the THz radiation and produce a reference signal; and an I/O mixer provided to modulate the reference signal with a signal or demodulate the reference signal to extract a signal, wherein the signal is transmitted or received via the antenna set.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A shows an overview of an exemplary wearable display device that may be used for applications of XR or other immersive experience according to one embodiment of the present invention;

FIG. 2B shows another embodiment in which the control box communicates with the display device directly via a wireless link;

FIG. 3B shows a rear perspective of a wearable display device according to one embodiment of the present invention;

FIG. 3C shows an explored view of a temple in a pair of glasses and an enclosure to house optical and electronic parts;

FIG. 3F shows a perspective view including an exemplary antenna element (e.g., planar antenna) that is disposed on top on a transparent substrate (e.g., a piece of glass or a polymer file);

FIG. 3G shows an equivalent circuit to be resonant at a particular frequency or range of frequencies;

FIG. 3H shows two exemplary charts in accordance with a few exemplary etch depths (thickness of the antenna strips);

FIG. 5B shows another embodiment in which the device 504 communicates with the controller 520 (e.g., iPhone) as well as another controller 522 (e.g., Apple Watch).

DETAILED DESCRIPTION OF THE PREFERRED EMBODIMENTS

Figure 1A:
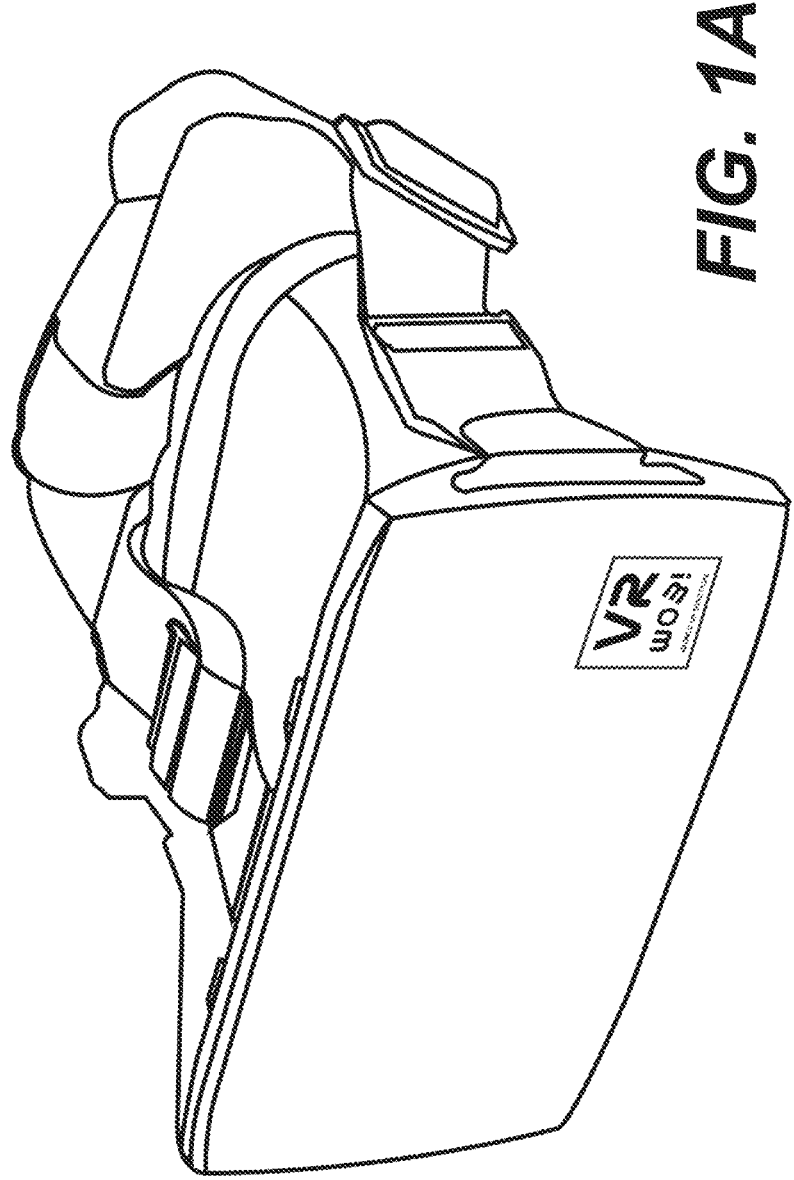
FIG. 1A shows an exemplary goggle now commonly seen in the market for the application of delivering or displaying VR/AR.
Figure 1B:
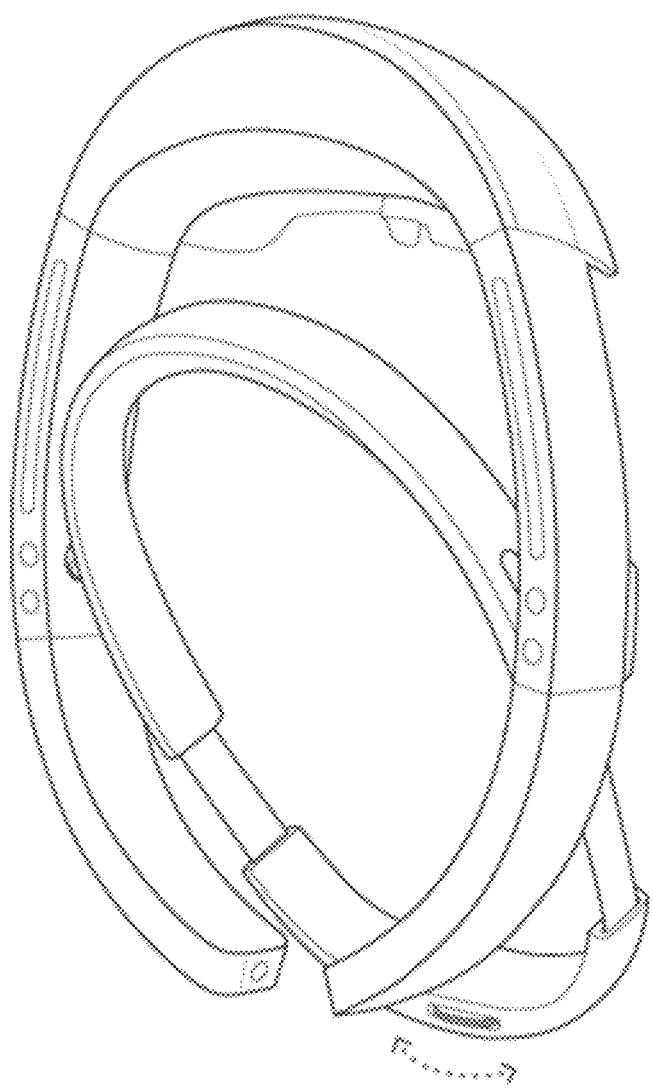
FIG. 1B shows a sketch of HoloLens from Microsoft.
Figure 1C:
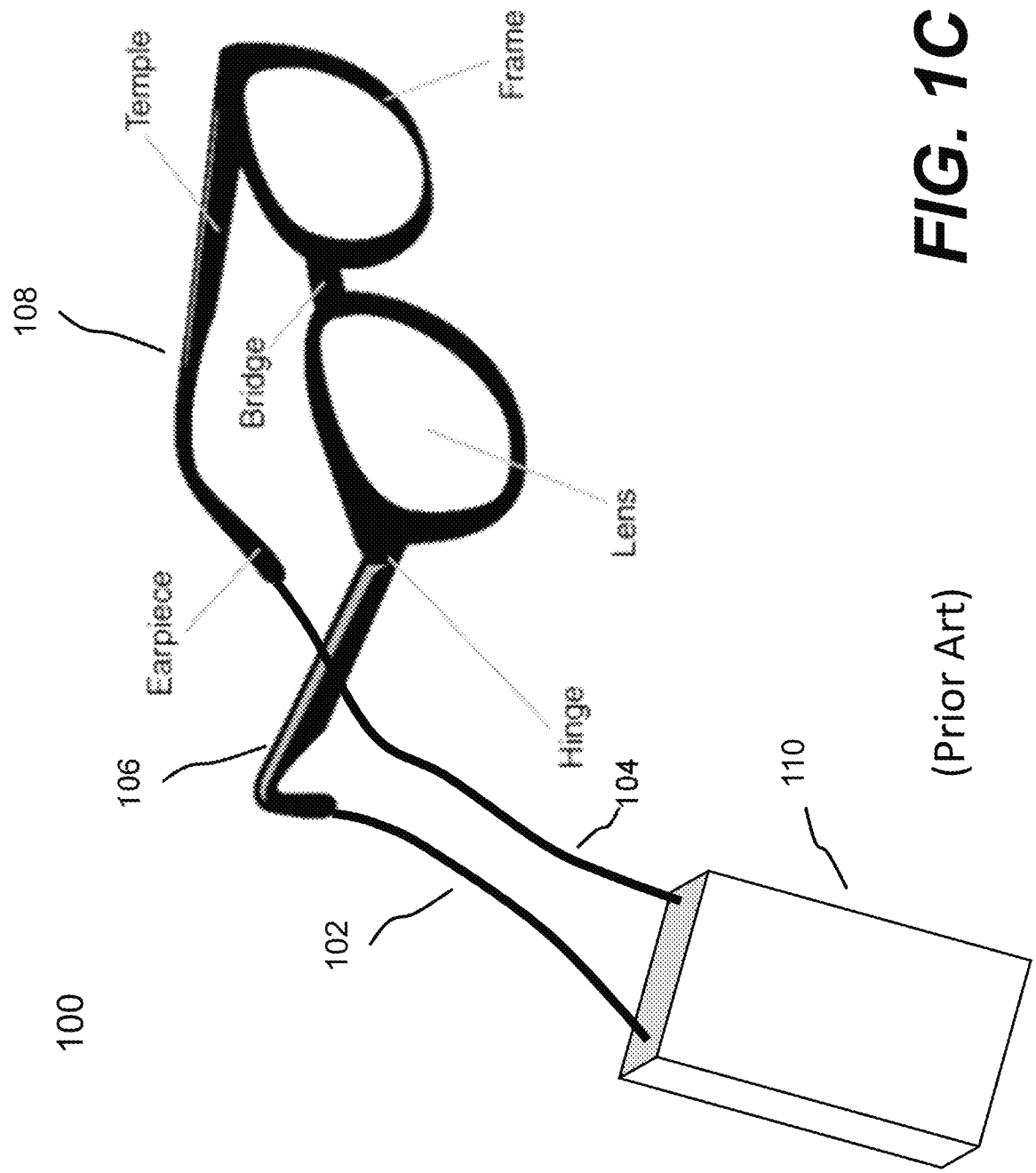
FIG. 1C shows a type of glasses 100 that can also be used for the application of XR or other immersive experience.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-5B. However, those skilled in the art will readily appreciate that the detailed description given herein with respect to these figures is for explanatory purposes as the invention extends beyond these limited embodiments.

Referring now to the drawings, in which like numerals refer to like parts throughout the several views. FIG. 2A shows an overview 200 of an exemplary wearable display device 202 that may be used for applications of XR or other immersive experience according to one embodiment of the present invention. The device is designed to appear no significant difference to a pair of normal glasses but include some extra components that will be further described. One of the advantages, benefits and objects the device 202 is provided is the wireless communication working in the band of terahertz or THz.

Radiation in THz, also known as submillimeter radiation, terahertz waves, has tremendously high frequency. The radiation is often referred to T-rays, T-waves, T-light, T-lux or simply THz, consisting of electromagnetic waves within the ITU-designated band of frequencies from 0.3 to 3 terahertz (THz), [2] although the upper boundary is somewhat arbitrary and is considered by some sources as 30 THz. One terahertz is 1012 Hz or 1000 GHz. Wavelengths of radiation in the terahertz band correspondingly range from 1 mm to 0.1 mm=100 μm. Because terahertz radiation begins at a wavelength of around 1 millimeter and proceeds into shorter wavelengths, it is sometimes known as the submillimeter band, and its radiation as submillimeter waves, especially in astronomy. This band of electromagnetic radiation lies within the transition region between microwave and far infrared, and can be regarded as either.

According to one embodiment, a computing device or control box 204 (e.g., a smart phone) is used to provide control signals and various data to an image engine 206 a first wireless link 208. As will be described further below, the image engine 206 is disposed in the glasses 202 and receives the signals and data wirelessly. A display screen (not labeled) in the display device 202 is driven by the image engine 206 via a second wireless link 210. In this embodiment, both of the first and second links 06 and 210 are THz-based wireless. Those skilled in the art that these components/parts must be equipped with THz-based transceiver. One of the embodiments in the present invention is the design of the transceiver, which will be further described in detail below when appropriate.

FIG. 2B shows another embodiment 220 in which the control box 204 communicates with the display device 202 directly via a wireless link 222. Depending on implementation, the image engine 206 of FIG. 2A delivers corresponding image/video data to a display in the display device 202 directly, optically or locally without using a wireless link. Unless specifically pointed out, FIG. 2A and FIG. 2B will be referred to interchangeably when details of the components/parts are described herein.

Figure 3A:
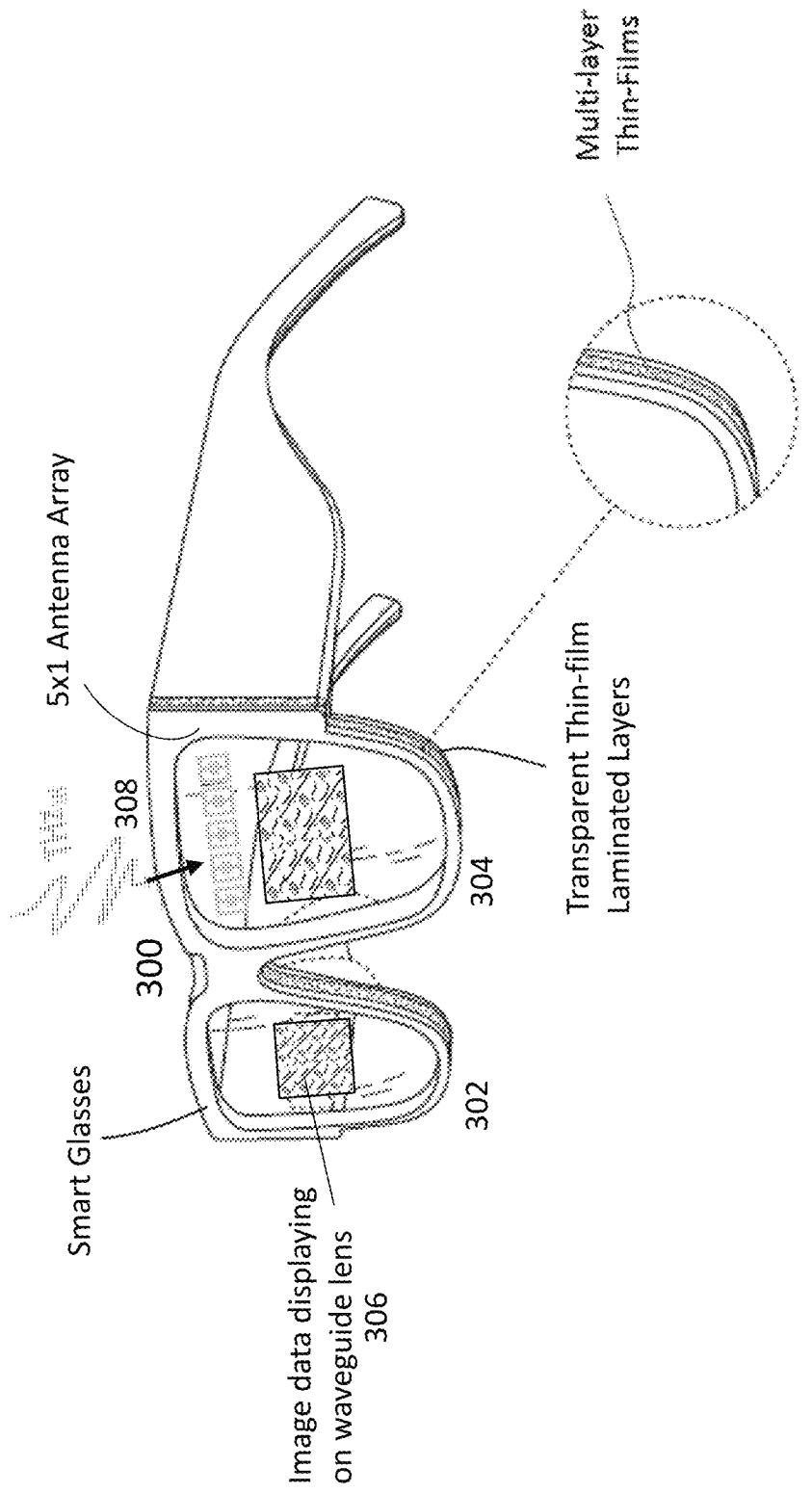
FIG. 3A shows an exemplary design of a wearable display device reassembling a pair of glasses with two integrated lenses.

Referring now to FIG. 3A, it shows an exemplary design of a wearable display device 300 reassembling a pair of glasses. There are two integrated lenses 302 and 304. A display area 306 is designated on each of the integrated lenses 302 and 304. It shall be noted that there is no requirement that each of the lenses 302 and 304 must be designated the display area 306. There may be applications in which only one of the lenses is needed for displaying data/video/image (a.k.a., content). Further the display area 306 is defined as a specific area on a lens for displaying the content and may be limited to a certain area of or an entire lens 302 or 304. One each of the lenses 302 and 304, there is an antenna 308. In one embodiment, there are a plurality of antenna embedded in or superimposed on a lens 302 or 304. The antenna 308 is provided to transceiver (transmit or receive) a wireless signal.

FIG. 3B shows a rear perspective of the device 300 according to one embodiment of the present invention. The temple 322 includes an extended temple 324, shaped substantially similar but expanded and integrated together. The extended temple 324 (e.g., in plastic or polycarbonate) provides a conduit to accommodate certain parts (e.g., wires or battery) and form an enclosure 326 near a lens frame 327 to enclose an image engine.

FIG. 3C shows an explored view of the temple 322 and the enclosure 326 to house optical and electronic parts. According to one embodiment, there is an optical cube 328 in the enclosure 326. A microdisplay 329 and a light source 330 are attached to the optical cube 328. The light from the light source 330 goes through the cube 328 and is modulated by a displayed image on the microdisplay 329 to form an optical image. The optical image is reflected from the microdisplay 329 and impinged upon the cube 328. A specially designed film or coating 331 in the cube 328 redirects the optical image to an optical unit (lens or lenses) 332 that projects the optical image into an optical waveguide 234 shown in FIG. 3B (representing FIG. 2B). According to another embodiment, the optical image is managed to be transmitted to a waveguide in the lens in which case the second wireless link is used (representing FIG. 2A). As will be further described below, the optical waveguide 334 acts as a medium to propagate the image to an appropriate position therein for a wearer to view the optical image.

Figure 3D:
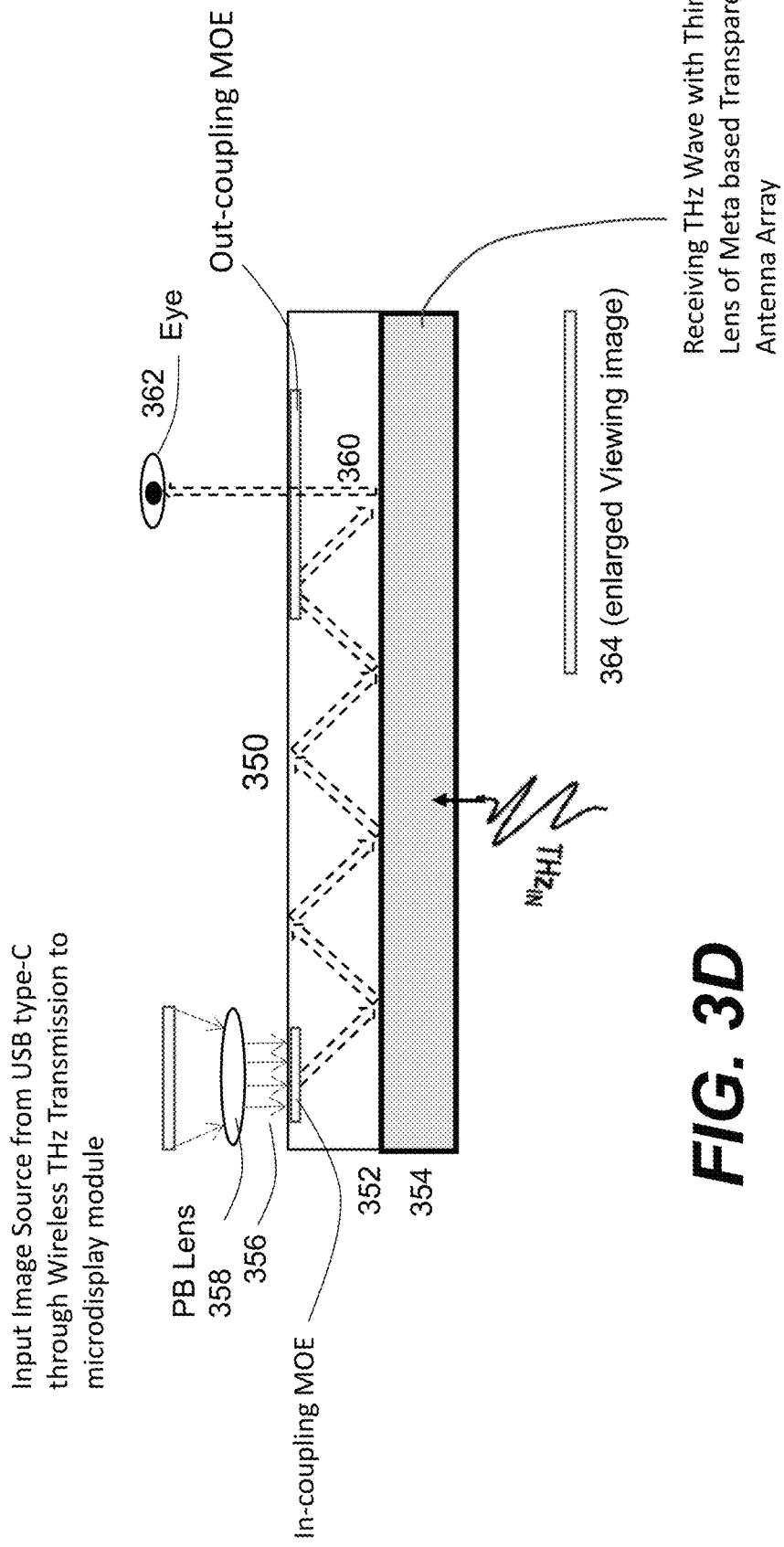
FIG. 3D shows an exemplary design of an integrated lens that may be used together or in an integrated lens.

FIG. 3D shows an exemplary design of an integrated lens 350 that may be used for the lens 302 or 304. The integrated lens 350 may also be referred to as a waveguide which means that a light beam travels within the lens 350. The lens 350 comprises two parts, a glass layer 352 and an antenna layer 354. As the name suggests, the glass layer 352 is largely a waveguide used to transport optical images 356 from an optical lens 358 to another end 360, where the optical image can be seen by a wearer (eye) 362.

As described above, one or more microdisplays are used to generate one or more optical images that are collected by the lens 332 as shown in FIG. 3C. The optical lens 358 (e.g., a collimator) corresponding to the lens 332 projects the image 356 into the waveguide 352. Depending on implementation, the waveguide 352 may be a stack of one or more pieces of highly transparent materials with different optical characteristics or glasses coated with one or more films to form a suitable transparent bar for displaying images/videos from a computing device. It is known to those skilled in the art that an optical waveguide is a spatially inhomogeneous structure for guiding light, i.e., for restricting the spatial region in which light can propagate, where a waveguide contains a region of increased refractive index, compared with the surrounding medium (often called cladding).

The waveguide 352 forms a display area (e.g., corresponding to the area 306 of FIG. 3A or the optical waveguide 334 of FIG. 3C). The waveguide 352 is transparent and shaped appropriately at one end to allow the image 356 to be propagated along within the waveguide 334 to the end 360, where the user 362 can see through the waveguide 360 so as to see the propagated image 356 therein. According to one embodiment, one or more films 364 are disposed upon the waveguide 356 to amplify the propagated image 356 so that the eye 362 can see a significantly amplified image 512. One example of such films is what is called metalenses, essentially an array of thin titanium dioxide nanofins on a glass substrate. The details of such films are described in U.S. Pat. No. 11,061,179 which is hereby incorporated by reference.

Figure 3E:
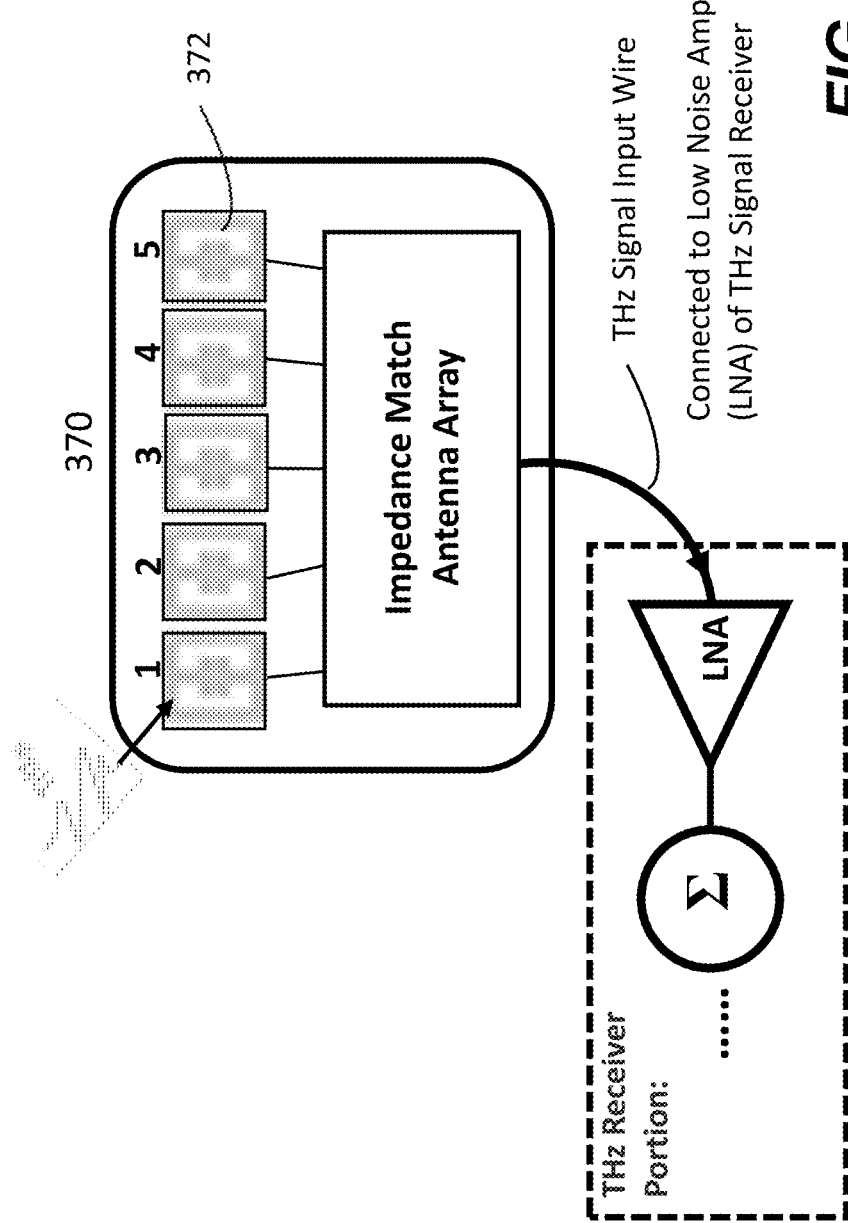
FIG. 3E shows an embodiment of an antenna layer shown in FIG. 3D. The antenna layer 354, where the antenna layer includes an antenna or an antenna array.

Referring now to FIG. 3E, it shows an embodiment of the antenna layer 354 of FIG. 3D. The antenna layer 354 includes an antenna or an antenna array. An antenna is a device that is used to transmit or receive electromagnetic waves. It is usually made of conductive materials, such as metal, and is designed to be resonant at a particular frequency or range of frequencies. While FIG. 3E shows an array 370 of five antenna elements 372, it shall be noted that any number of the antenna elements 372 is appropriate as long as the impedance thereof matches. Impedance matching is the process of designing the input impedance of an antenna or matching it to the output impedance of corresponding RF circuitry. In general, the more antenna elements, the more sensitive the array 370 is, thus better reception or transmission. Depending on implementation, the array 370 may be extended from a small area to a large area on a lens and/or to some or all of the frame that holds the lens, even some or all of one or both of the temples. In one embodiment, the array 370 is made out of very thin conductive materials on a transparent layer corresponding to the antenna 308 of FIG. 3A.

FIG. 3F shows a perspective view 380 including an exemplary antenna element 382 (e.g., planar antenna) that is disposed on top on a transparent substrate 384 (e.g., a piece of glass or a polymer file. In one embodiment, an ITO layer is further deposited on the other side of the substrate 384. ITO standing for Indium tin oxide is a ternary composition of indium, tin and oxygen in varying proportions. It is transparent and colorless in thin layers.

The element 382 is also shown as a designed or specific geometry shape formed to maximize its transceiving efficiency. The thickness, length, width and even turns of the conductive strips as well as the gap between two conductive strips are very well specified to ensure the impedance matching along with the maximized transceiving efficiency including the sensitivity of the antenna and other parameters. FIG. 3G shows an equivalent circuit to be resonant at a particular frequency or range of frequencies. According to one embodiment, the parameters W, T, H and G are redefined or calculated dimensions of the antenna element 382, typically in pm range to resonant at a predefined frequency. In one embodiment, one or more of these parameters are further tuned to reach the required resonant frequency (e.g., an optimized THz wave frequency or 300 GHz). For example, tuning the etch depth "d" of the stipe (equivalent RLC circuit of the planar electric metamaterial antenna element) can also cause the antenna to be resonant at frequency 300 GHz for a unique THz wave application. According to one embodiment, the element 382 or an array of coupled elements substantially similar to the element 382 are formed through an etching process. FIG. 3H shows two exemplary charts in accordance with a few exemplary etch depths (thickness of the antenna strips).

Figure 3I:
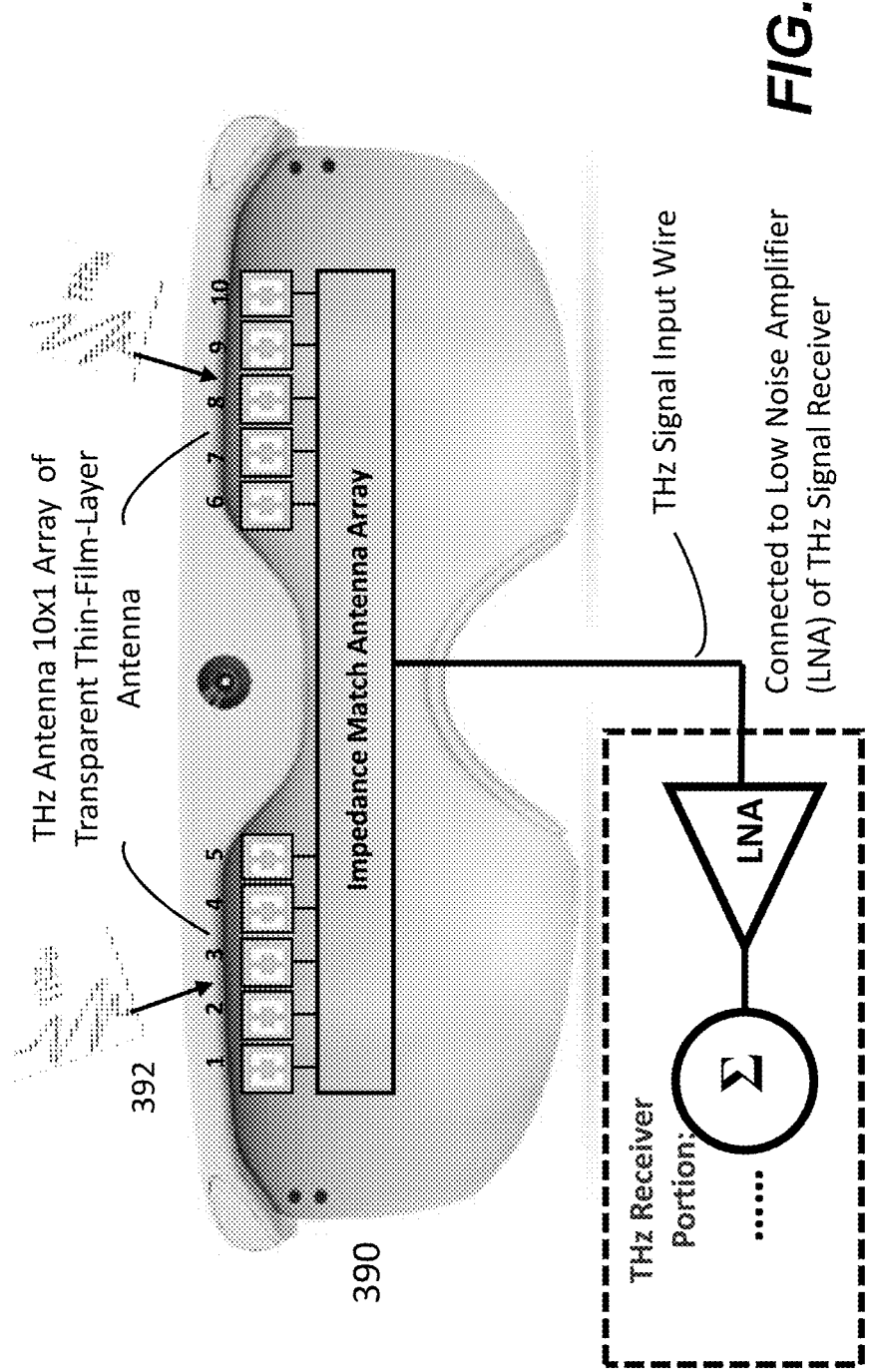
FIG. 3I shows a single piece of glasses (e.g., clip-on or goggle) that carries one or more antenna arrays.

FIG. 3I shows a single piece of glasses 390 (e.g., clip-on or goggle) that carries one or more antenna arrays 392. According to one embodiment, a clip-on single piece 390 is used to provide the XR or immersive experience. A user may have the freedom to wear a pair of regular glasses or turn the glasses into a wearable display device by adding the clip-on single piece 390.

Figure 4A:
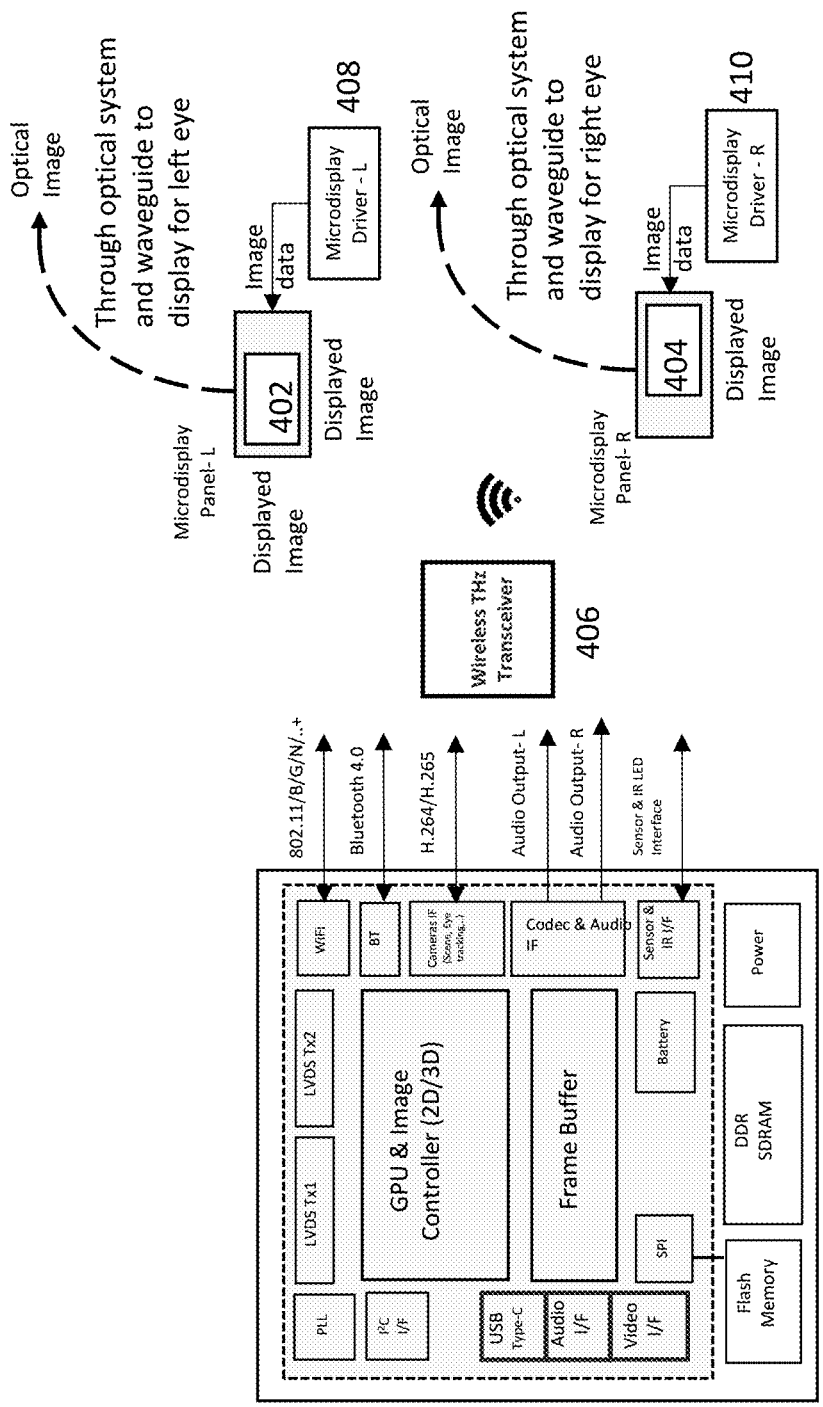
FIG. 4A shows an exemplary implementation for an electronic portion that may be used in or as part of the control box to provide control signals and various data to drive an exemplary display device according to one embodiment of the present invention.

As described above, the wearable display device 300 of FIG. 3A communicates wirelessly with a control box, where the control box provides all control signals and various data. In one embodiment, the wireless communication is conducted in the band of THz. Accordingly, the device 300 and the control box must be equipped with at least one transceiver responsible for enabling the wireless communication. Depending on implementation, the control box may be a specifically designed control device or a smart phone. FIG. 4A shows an exemplary implementation for the electronic portion 400 that may be used in the control box to provide control signals and various data to drive the display device 300 via two microdisplays 402 and 404 (assuming both lenses in the device 300 are to display the content), where the two microdisplays 402 and 404 are enclosed in an image engine (e.g., the enclosure 326 of FIG. 3B). The details of the electronic portion 400 are commonly known to those skilled in the art and omitted herein to avoid obscuring aspects of the invention. The electronic portion 400 is coupled to a transceiver 406 that facilitates the wireless communication between the control box and the device 300, where the device 300 includes at least one corresponding transceiver (not shown) coupled to the image engine.

In operation, the control signals and various data are wirelessly communicated between the electronic portion 400 and the image engine that drives two microdisplays 402 and 404 via two corresponding drivers 408 and 410. The wireless communication becomes possible with the antenna described above and at least one of transceivers (e.g., the transceiver 406).

Figure 4B:
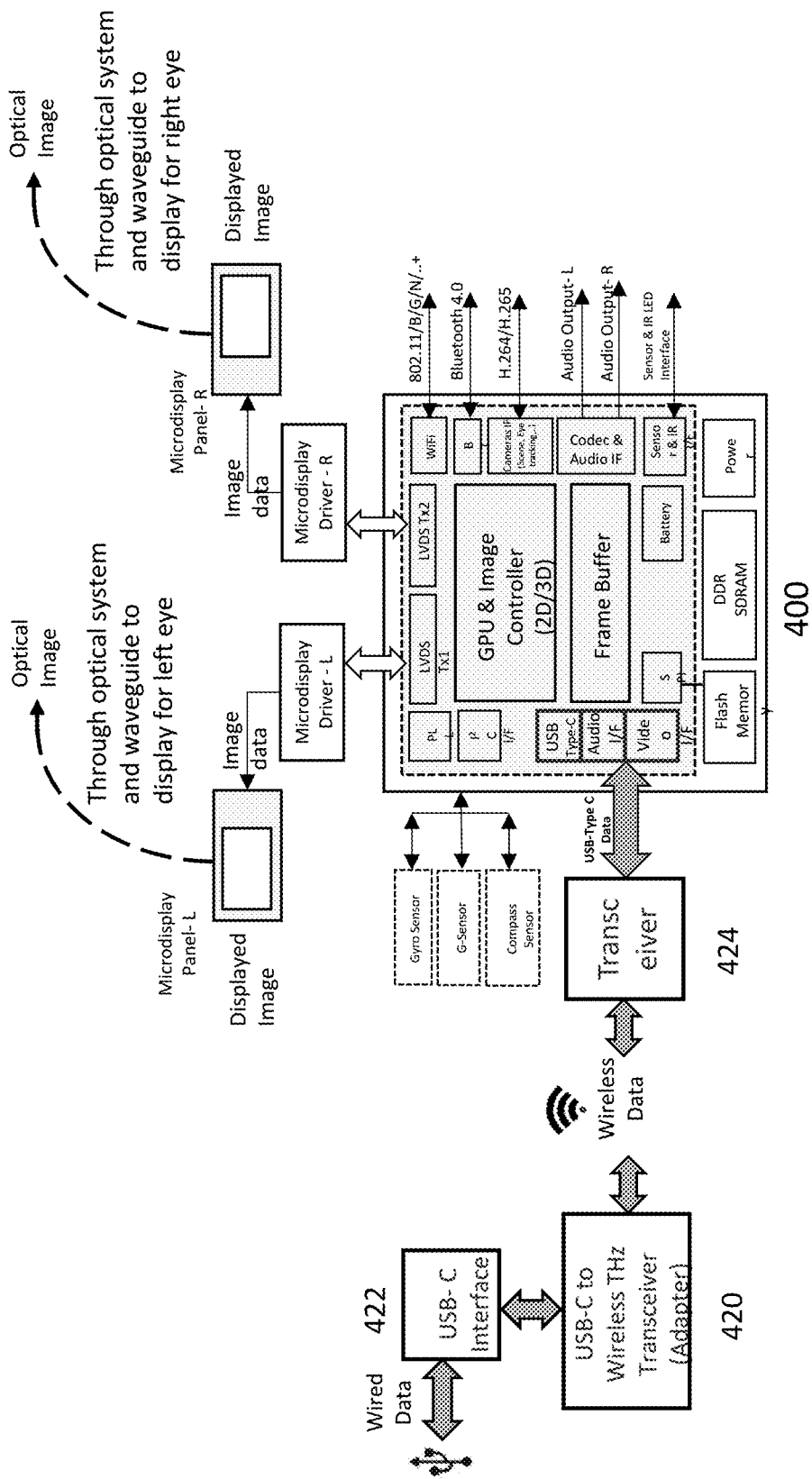
FIG. 4B shows another embodiment in accordance with the present invention.

FIG. 4B shows another embodiment in accordance with the present invention. This embodiment enables connectivity between a wired interface to a display device. An exemplary wired interface is USB Type-C, often referred to as USB-C, being a versatile and widely adopted connector standard for connecting various devices and peripherals. The embodiment is appropriate when a control box (e.g., a smartphone) is already equipped with a USB-C, where the control box provides all control signals as well as various data. To enable wireless communication in THz band between the control box and display device, a USB-C to Wireless THz Transceiver (Adapter) 420 is provided to convert all wired signals from a wired interface 422 (e.g., USB-C) into wireless signals or vice versa. The wireless signals are received in a corresponding transceiver 424 via an antenna (e.g., antenna array 370), where the transceiver 424 is shown to convert the demodulated signals back to signals in compliance with the USB-C standard to continue the processing of the signals in the electronic portion 400. According to another embodiment, the demodulated signals may be coupled to the electronic portion 400 without converting the demodulated signals to the USB-C signals.

Figure 4C:
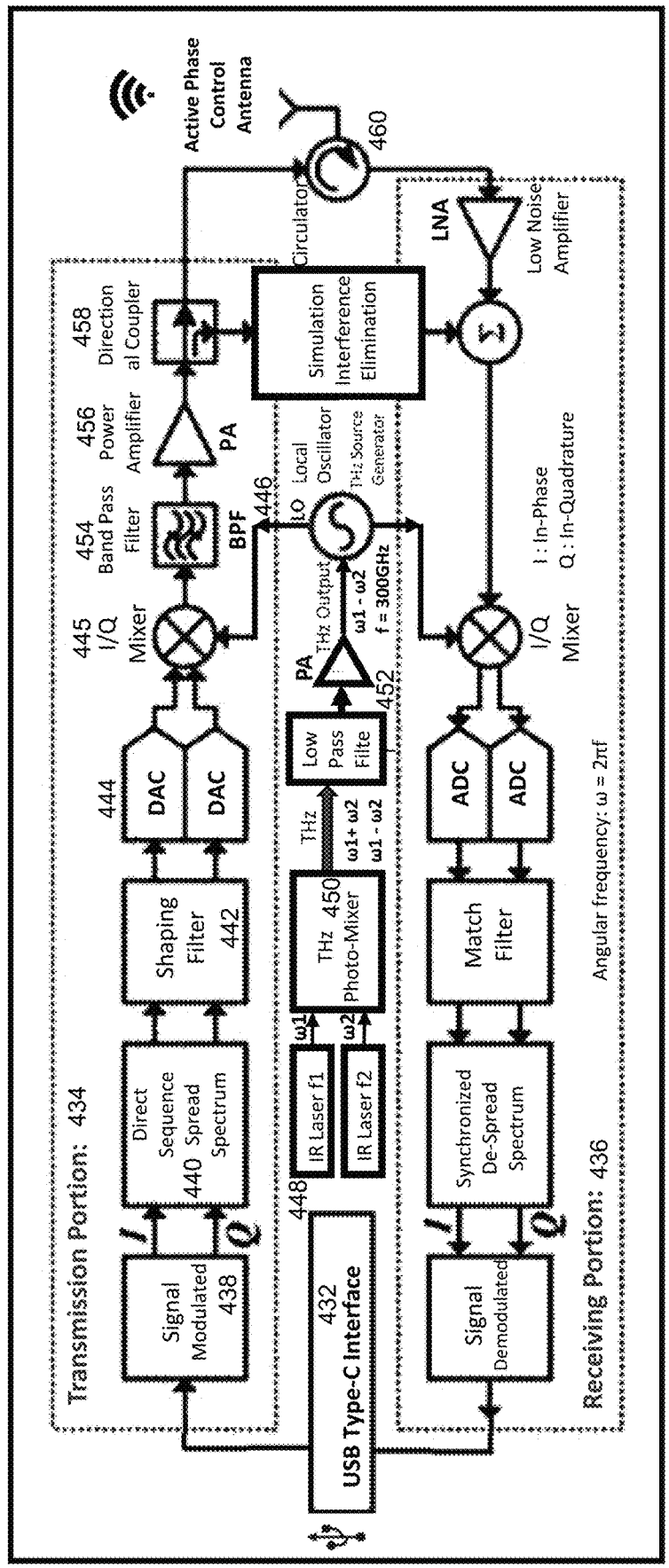
FIG. 4C shows a functional block diagram of an exemplary transceiver according to one embodiment of the present invention.

FIG. 4C shows a functional block diagram of a transceiver 430 according to one embodiment of the present invention. The transceiver 430 includes the USB-C conversation circuit 432. Those skilled in the art can appreciate that the transceiver 430 can be simply modified to accommodate other signals from other interfaces (e.g., Bluetooth or Wi-Fi) in view of the description herein. The transceiver 430 includes a transmission portion 434 and a receiving portion 436. When one or more signals are received from an interface (e.g., the USB-C interface 432), the signals are modulated in a modulator 438 that produces two components: the in-phase (I) component and the quadrature (Q) component. Essentially in the context of quadrature modulation schemes, such as Quadrature Amplitude Modulation (QAM), the modulated signal includes these two components: the I component and the Q component. The I component represents the real part of the modulated signal, and the Q component represents the imaginary part of the modulated signal. Together, these components convey both the amplitude and phase information of the modulated signal.

In one embodiment, the I and Q components are derived by using a technique called quadrature demodulation, which involves mixing the modulated signal with two local oscillator signals that are 90 degrees out of phase with each other. The resulting signals after mixing are the I and Q components. By having two separate components, the modulated signal can be efficiently transmitted and received using complex number representation. The I and Q components allow for more efficient use of the available bandwidth, as they can transmit multiple bits of information per symbol, enabling higher data rates. The combination of I and Q components also facilitates the demodulation process, allowing the original signal to be accurately recovered at the receiver end.

The modulated signals (I and Q components) are coupled to a DSSS modulator 440, where DSSS stands for Direct Sequence Spread Spectrum. This modulator 440 takes the original data signal and combines it with a spreading code to generate a spread spectrum signal. Depending on implementation, the DSSS modulator 440 may also include other components such as a carrier frequency generator and filters 442 to shape the transmitted signal. DSSS is a modulation technique, known to those skilled in the art, used in wireless communication systems to improve the reliability and security of data transmission. It achieves this by spreading the signal across a wider bandwidth than necessary for the transmission of the original data. In DSSS, the data to be transmitted is multiplied by a spreading code, which is a pseudorandom binary sequence (PRBS) of 1s and 0s. This spreading code has a much higher data rate than the original data, effectively spreading the signal over a wider frequency band. The resulting spread spectrum signal has a lower power spectral density, meaning it occupies a larger frequency bandwidth compared to the original signal. DSSS is commonly used in various wireless communication standards, including Wi-Fi (IEEE 802.11b) and Bluetooth, to provide robust and secure data transmission in noisy or crowded environments.

The outputs from the DSSS modulator 440 are coupled to one or more DAC 444 (Digital-to-Analog Converter). It is an electronic device or circuit that converts digital signals into analog signals. The analog signals from the DAC 444 are mixed in a mixer 445 (e.g., I/Q mixer) with a signal of a different frequency from a local oscillator (LO) 446.

An I/Q mixer, also known as a quadrature mixer or a complex mixer, is a type of mixer used in electronics and communications systems to convert signals between the analog and digital domains, where I and Q in I/Q stand for In-phase and Quadrature, respectively. The main purpose of the I/Q mixer 445 is to shift the frequency of the input signals. It achieves this by multiplying the I and Q signals with the LO signal. The multiplication process involves combining the two input signals with the LO signal, resulting in sum and difference frequencies being generated.

One of the important advantages, benefits and objects in the present invention is the generation of the LO signal from the local oscillator 446. According to one embodiment, at least two optical sources 448 are used to initially generate optical signals. In one embodiment, two IR laser diodes are used to generate infrared signals, a type of laser that emits light in the infrared portion of the electromagnetic spectrum. Infrared light has longer wavelengths than visible light, ranging from approximately 700 nanometers (nm) to 1 millimeter (mm), beyond the range of human vision.

The optical signals are projected onto a photo mixer 450, also referred to as a terahertz photo mixer, a device used for generating or detecting terahertz (THz) radiation, typically between 0.1 and 10 THz, corresponding to wavelengths in the range of 30 micrometers to 3 millimeters. In operation, two optical beams from the laser source 448 are directed onto a photoconductive material. One beam acts as a pump beam, typically in the near-infrared or visible range, and the other beam is the terahertz signal beam. By applying a voltage bias across the photoconductive material, a generated terahertz output signal can be amplified and radiated as terahertz radiation. This process is known as terahertz generation or emission. In terahertz detection: the terahertz photo mixer functions as a terahertz detector. The terahertz signal is incident on the photoconductive material, generating a time-varying current. This current can be amplified and processed to extract the terahertz signal information.

The outputs (e.g., $\omega1+\omega1$, and $\omega1-\omega1$) from the photo mixer 450 are coupled to a lowpass filter 452 to produce signals with only wanted frequencies (e.g., 300 GHz). The signals are provided to the oscillator 446 to generate a repetitive waveform or signal with a specific frequency and amplitude in different shapes, such as sinusoidal, square, triangular, or sawtooth, depending on implementation.

The output from the photo mixer 450 is further processed in a band-pass filter 454 to pass signals within a specific frequency range while attenuating or blocking signals outside that range. The filtered output is then amplified in an amplifier 456 to a predefined level before reaching a directional coupler 458, where the directional coupler is a device used to separate or combine power between multiple transmission lines. It allows for the monitoring, sampling, or coupling of signals in a specific direction while minimizing the impact on the main signal path. The main signal from the directional coupler 458 are transmitted via an antenna 460.

Figure 4D:
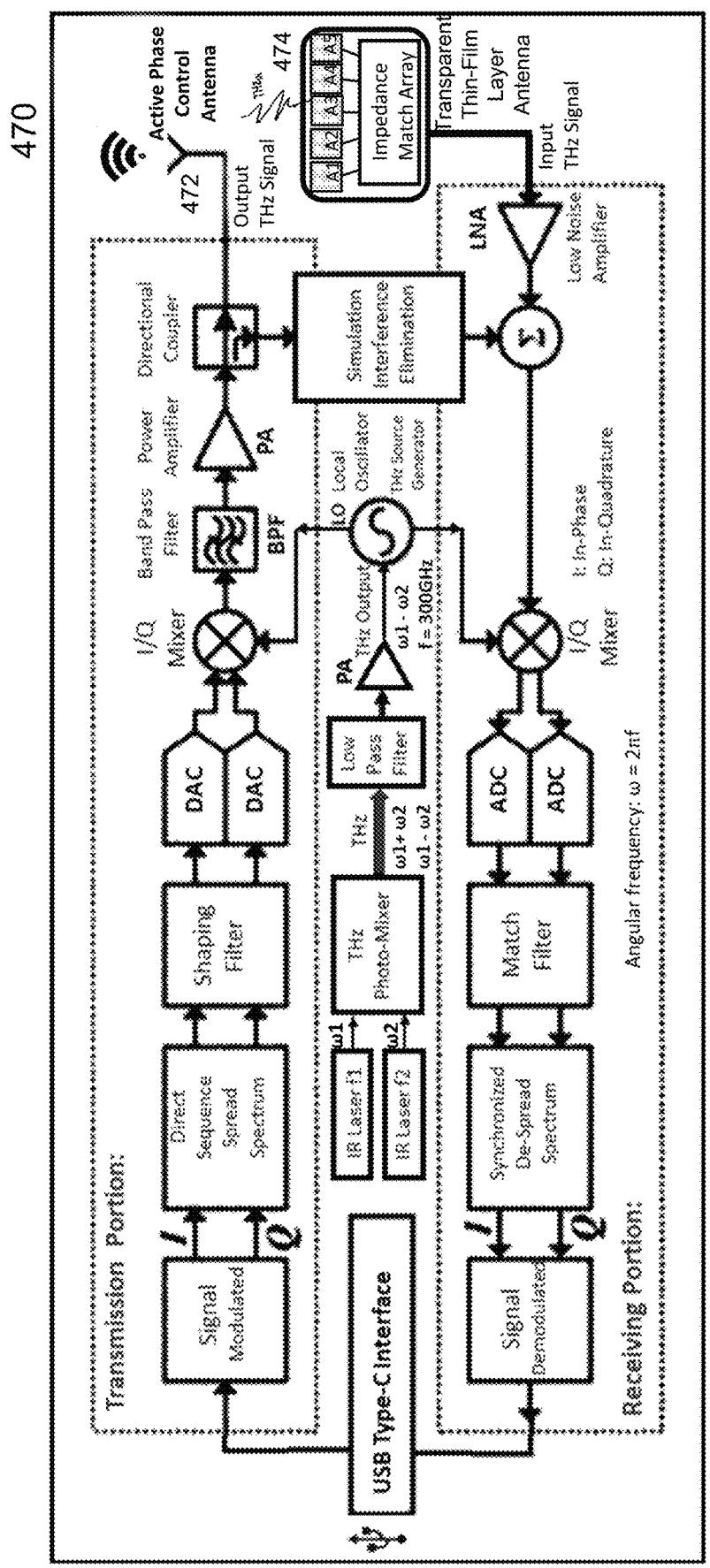
FIG. 4D shows a functional diagram of another terahertz wireless transceiver that may be used in smart XR glasses.

The operation of the transceiver 430 on receiving signals is opposite and substantially similar to the transmitting operation as described above. Those skilled in the art shall understand the substantially identical parts and their respective operations in the receiving portion 436 given the detailed description above. For completeness, FIG. 4D shows a functional diagram of another terahertz wireless transceiver 470 that may be used in smart XR glasses. The transceiver 470 is substantially identical to the transceiver 430 of FIG. 4C except a first antenna 472 is used to transmit wireless signals while a second antenna 474 is used to receive wireless signals. In other words, the transmitting and receiving antennas are two independent antennas. According to one embodiment, the planar antenna 472 is implemented with a thin-film metamaterial transparent antenna.

According to one embodiment, an exemplary thin-film metamaterial transparent antenna is an antenna structure that incorporates metamaterials and substantially transparent to certain frequencies of electromagnetic waves. As described above, the planar antenna 472 or 308 of FIG. 3A includes conductive materials in very fine size (e.g., nanometers) that are barely visible when deposed on an integrated lens. The metamaterials are artificially engineered materials that exhibit unique electromagnetic properties not found in naturally occurring materials. They are designed to manipulate the behavior of electromagnetic waves in ways that are not possible with conventional materials. In one embodiment, the thin-film metamaterial transparent antenna involves integrating metamaterial elements into a thin film or substrate material, allowing it to transmit and receive electromagnetic waves while maintaining high transparency. This type of antenna can be particularly useful in applications where aesthetics and visibility are important, such as in transparent windows, displays, or other devices where conventional antennas may be visually obtrusive.

The design and fabrication of thin-film metamaterial transparent antennas may vary depending on the specific requirements and operating frequencies. Typically, the antenna structure includes metamaterial elements embedded or patterned into a thin film, which can be made from various transparent materials like glass or plastic. The metamaterial elements are carefully engineered to manipulate the propagation of electromagnetic waves and achieve desirable antenna properties such as radiation efficiency, directivity, and impedance matching.

One of the key advantages of thin-film metamaterial transparent antennas is their ability to operate over a wide frequency range while maintaining transparency. By tailoring the design parameters of the metamaterial elements, such as their size, shape, and arrangement, it is possible to create antennas that are transparent to specific frequencies or frequency bands. This allows for seamless integration of antennas into transparent surfaces without compromising the overall functionality or appearance.

Figure 5A:
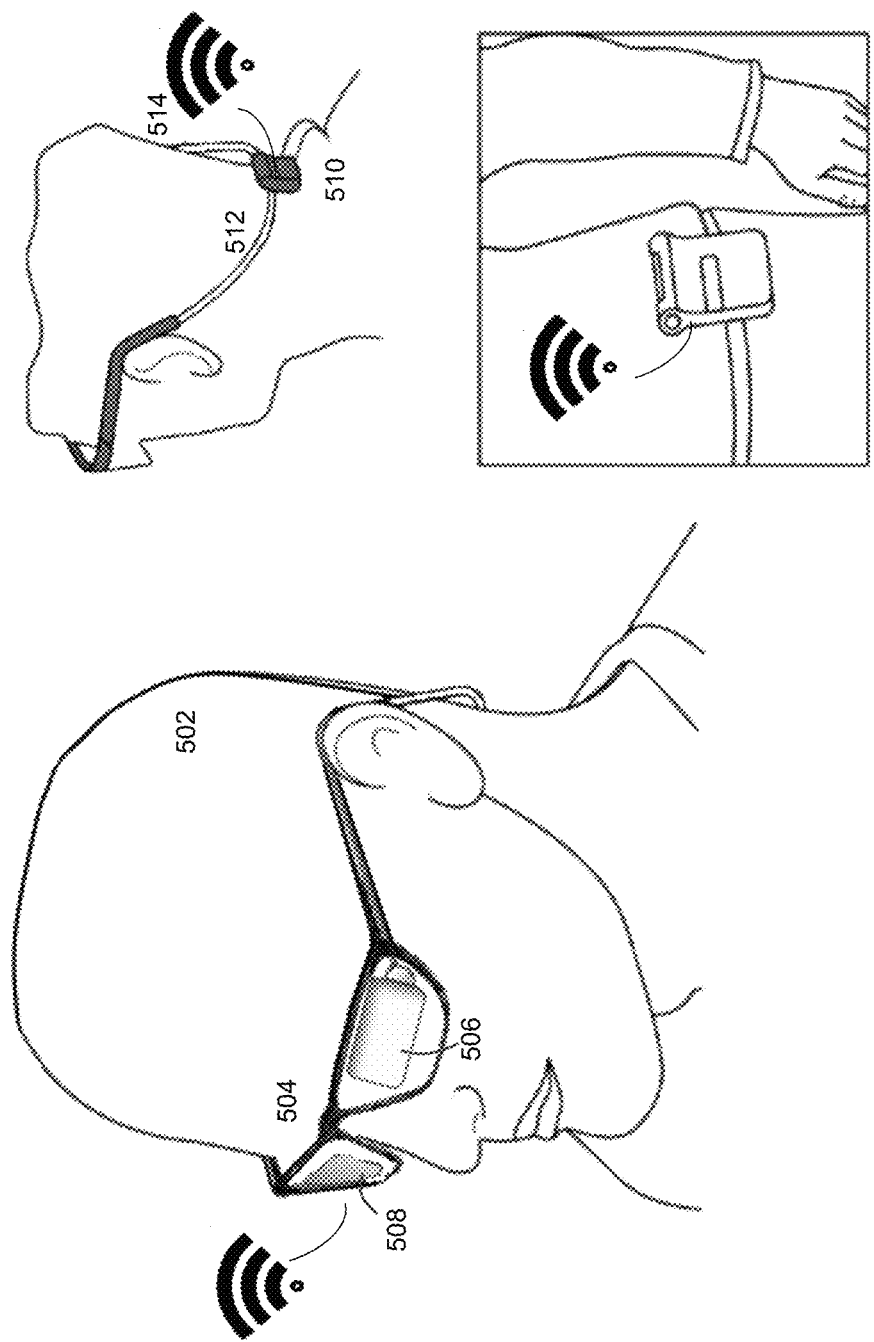
FIG. 5A shows an exemplary configuration in which a user is shown to wear a wireless display device resembling a pair of reading glasses or sunglasses according to one embodiment of the present invention.

Referring now to FIG. 5A, it shows an exemplary configuration 500 in which a user 502 is shown to wear a wireless display device 504 resembling a pair of reading glasses or sunglasses. According to one embodiment of the present invention, the device 504 includes two integrated lenses 506 and 508 that each further include at least one waveguide that allows an optical image to travel within the waveguide. It should be noted that an optical image is different from an electronic image or image data. An optical image refers to a visual representation of an object or scene formed by light rays interacting with optical systems such as lenses or mirrors while an electronic image or image data indicates the signals or data that can be used to display an image represented by the data image/electronic image. In other words, an optical image is the image formed by actual physical light rays that enter eyes and cab be captured by an optical device (e.g., lenses or sensors). Technically, an optical image may be considered as an array of light intensities varying in multiple dimensions (e.g., 2D or 3D).

The device 504 receives image data or other signals over the air or wirelessly via an antenna array (not shown, corresponding to the antenna 308 of FIG. 3A) that can be disposed on top of or imbedded in the lens 506 or 508. According to one embodiment, the antenna 504 may also be distributed across the frames or temples of the glasses 504. According to another embodiment, the antenna is disposed on a separate part 510 that may be perceived as a balancing unit or balancer, where the separate part 510 may be used to house circuitry, batteries or etc. and coupled to the glasses 504 via a pair of cables 512 and 524. The balancer 510 is provided to counteract the weight of the device 504 so that the wearer may feel balanced in weight when wearing the glasses 504.

FIG. 5A also shows that the user 502 has a carry-on control device or controller 520 (e.g., a smart phone) that communicates with the device 504 over the air according to one embodiment of the present invention. It shall be noted to those skilled in the art that the antenna included in the device 504 is not limited to only communications with the controller 520. In one embodiment, the antenna receives image data while the user 502 walks near a designated area. The image data may be from a plurality of antennas disposed near the designated area. As the user moves around in the area, the user can stay connected and enjoy the immersive experiences.

FIG. 5B shows another embodiment in which the device 504 communicates with the controller 520 (e.g., iPhone) as well as another controller 522 (e.g., Apple Watch). Either one of the controllers 520 and 522 can control the device 504, provide data or cause the device 504 to receive data from a nearby antenna or designated hotspot(s).

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A system for operating a terahertz transceiver, the system comprising:
    an antenna set;
    two optical sources generating two optical beams at two different frequencies;
    a photo mixer for generating or detecting terahertz (THz) radiation, wherein the two optical beams from the optical sources are directed onto a photoconductive material, a generated terahertz output signal is amplified and radiated as the terahertz radiation when applying a voltage bias across the photoconductive material;
    a local oscillator receiving the THz radiation and producing a reference signal; and
    an I/O mixer provided to modulate the reference signal with a signal or demodulate the reference signal to extract a signal, wherein the signal is transmitted or received via the antenna set.

2. The system as recited in claim 1, wherein the optical sources are two laser diodes, and the two optical beams are laser beams.

3. The system as recited in claim 2, wherein the antenna set includes a first antenna and a second antenna, the first antenna and second antenna are in different forms, one for transmission and the other for reception.

4. The system as recited in claim 3, wherein the signal is transmitted via the first antenna, and the signal is received via the second antenna.

5. The system as recited in claim 4, wherein the second antenna is a planar antenna disposed on top of an integrated lens in a wearable display device.

6. The system as recited in claim 1, further comprising: an interface to transport the signal.

7. The system as recited in claim 6, wherein the interface is a USB Type-C.

8. A method for operating a terahertz transceiver, the method comprising:
    providing an antenna set in a wearable display device;
    generating from two optical sources at least two optical beams at two different frequencies;
    generating or detecting terahertz (THz) radiation in a photo mixer, wherein the two optical beams from the optical sources are directed onto a photoconductive material, a generated terahertz output signal is amplified and radiated as the terahertz radiation when applying a voltage bias across the photoconductive material;

receiving from a local oscillator the THz radiation to produce a reference signal; and modulating in an I/O mixer the reference signal with a signal or demodulate the reference signal to extract a signal, wherein the signal is transmitted or received via the antenna set.

9. The method as recited in claim 8, wherein the optical sources are two laser diodes, and the two optical beams are laser beams.

10. The method as recited in claim 9, wherein the antenna set includes a first antenna and a second antenna, the first antenna and second antenna are in different forms, one for transmission and the other for reception.

11. The method as recited in claim 10, wherein the signal is transmitted via the first antenna, and the signal is received via the second antenna.

12. The method as recited in claim 11, wherein the second antenna is a planar antenna disposed on top of an integrated lens in a wearable display device.

13. The method as recited in claim 8, further comprising: transporting or receiving the signal to or from an interface.

14. The method as recited in claim 13, wherein the interface is a USB Type-C.

* * * * *